United States Patent [19]
Koveal et al.

[11] Patent Number: 6,107,353
[45] Date of Patent: *Aug. 22, 2000

[54] CYANIDE AND AMMONIA REMOVAL FROM SYNTHESIS GAS

[75] Inventors: Russell J. Koveal; Stephen C. Leviness, both of Baton Rouge, La.

[73] Assignee: Exxon Research and Engineering Company, Florham Park, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/797,368

[22] Filed: Feb. 7, 1997

Related U.S. Application Data

[63] Continuation-in-part of application No. 08/512,734, Aug. 8, 1995, abandoned, and a continuation-in-part of application No. 08/636,425, Apr. 23, 1996, abandoned.

[51] Int. Cl.$^7$ .............................. C07C 27/06; B01D 53/54
[52] U.S. Cl. ............................ 518/705; 423/236; 423/237
[58] Field of Search .................... 423/236, 237; 518/705

[56] References Cited

U.S. PATENT DOCUMENTS

| | | | |
|---|---|---|---|
| 4,271,133 | 6/1981 | Tellis | 423/236 |
| 4,810,475 | 3/1989 | Chu et al. | 423/236 |
| 4,981,661 | 1/1991 | Borsboom et al. | 423/244 |
| 5,068,254 | 11/1991 | Posthuma | 518/705 |
| 5,260,239 | 11/1993 | Hsia | 518/700 |
| 5,463,168 | 10/1995 | Audeh et al. | 585/854 |
| 5,466,427 | 11/1995 | Rumpf et al. | 423/210 |
| 5,486,313 | 1/1996 | De Jong | 252/373 |

FOREIGN PATENT DOCUMENTS

| | | | |
|---|---|---|---|
| 2157542 | 3/1996 | Canada | B01J 21/06 |
| 0380184 | 8/1990 | European Pat. Off. | C10K 1/34 |
| 4424695 | 7/1993 | European Pat. Off. | B01J 23/88 |
| 0757969A1 | 2/1997 | European Pat. Off. | C01B 3/58 |
| 4424695A1 | 1/1995 | Germany | B01J 23/88 |
| 54-018466 | 2/1979 | Japan | B01D 53/34 |
| 2159132 | 11/1985 | United Kingdom | B01D 53/36 |
| 9429004 | 12/1994 | WIPO | B01D 53/36 |

*Primary Examiner*—Steven P. Griffin
*Assistant Examiner*—Peter DiMauro
*Attorney, Agent, or Firm*—Jay Simon

[57] ABSTRACT

Cyanide and ammonia are removed from a gas, such as a synthesis gas, by catalytically hydrolyzing cyanide in the gas to ammonia, water scrubbing the hydrolyzed gas to dissolve ammonia and at least a portion of remaining cyanide, and optionally, contacting the scrubbed gas with an adsorbent for cyanide and ammonia to form a clean gas containing less than 50 vppb of a combined total of cyanide and ammonia. The clean synthesis gas is then fed into a hydrocarbon synthesis reactor wherein it produces hydrocarbons with substantially reduced catalyst deactivation and cleaner hydrocarbon products.

18 Claims, 1 Drawing Sheet

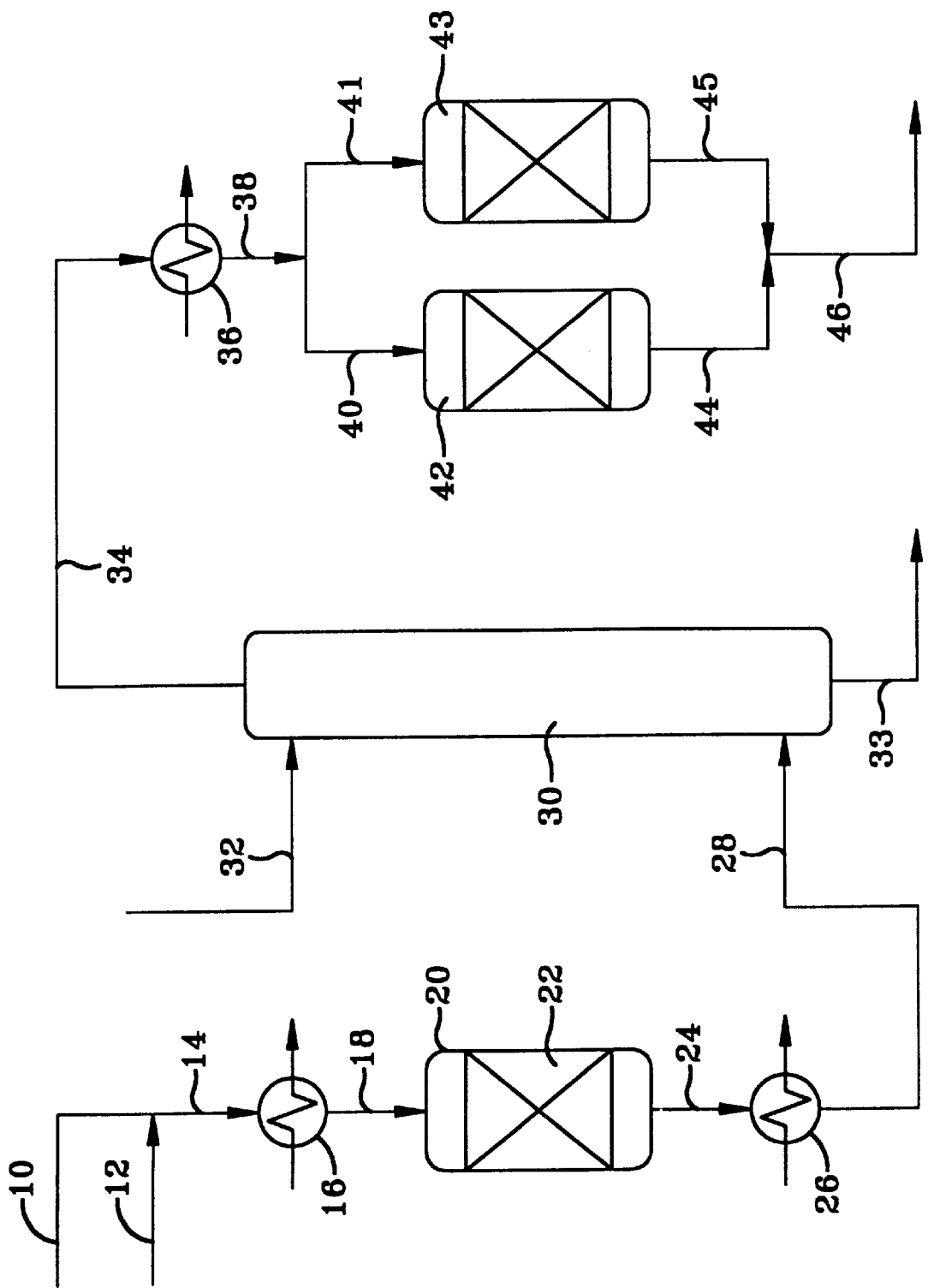

CYANIDE AND AMMONIA REMOVAL FROM SYNTHESIS GAS

CROSS-REFERENCE TO RELATED APPLICATIONS

This application is a continuation-in-part of U.S. patent application Ser. Nos. 08/512,734 abandoned and 08/636,425 abandoned respectively filed on Aug. 8, 1995 and Apr. 23, 1996.

BACKGROUND OF THE DISCLOSURE

1. Field of the Invention

The invention relates to a process for removing HCN and $NH_3$ from a gas, such as a synthesis gas, to produce a clean gas containing less than 20 vppb of a combined total of HCN and $NH_3$, via catalytic hydrolysis, water scrubbing and adsorption, and to a hydrocarbon synthesis process using the clean synthesis gas.

2. Background of the Invention

The removal of HCN and $NH_3$ from gas streams is sometimes required to prevent catalyst poisoning, product contamination and for environmental reasons. For example, Fischer-Tropsch type catalysts useful for forming hydrocarbons from a synthesis gas mixture of $H_2$ and CO (syngas) are known to be deactivated by HCN and $NH_3$. Producing syngas from a fossil fuel which contains nitrogen or nitrogen compounds also forms $NH_3$ and HCN, which can deactivate these and other catalysts. Methods for reducing the HCN content of various gasses, including syngas, have included catalytic hydrolysis (U.S. Pat. No. 4,769,224) and chemical scrubbing (U.S. Pat. No. 5,068,254). However, while these patents disclose reducing the HCN level down to about 0.1 ppm or 100 ppb, it has now been found that even as little as 100 vppb of a combined total of HCN and $NH_3$ in the syngas results in unacceptably short Fischer-Tropsch catalyst life. It has also been found that deactivation of such catalysts by HCN and $NH_3$ may be reversed and catalytic activity restored by contacting the deactivated catalyst with hydrogen. Consequently, the catalyst must be at least periodically rejuvenated with hydrogen to restore its activity. In a fixed bed reactor this means taking the reactor off-line. In a fluid bed reactor the reactor is taken off-line or the catalyst particles are circulated between the reactor and a rejuvenation vessel. In a slurry process the reactor is taken off-line or the catalyst may be rejuvenated either intermittently or continuously while the reactor is on-line. Up until the present invention, it has not been practicably feasible to reduce the level of the HCN and $NH_3$ catalyst poisons in the syngas to where the catalyst has a commercially acceptable half life requiring minimal rejuvenation.

SUMMARY OF THE INVENTION

The present invention relates to a process for reducing the level of HCN and $NH_3$ in a gas, and particularly a synthesis gas (syngas) comprising a mixture of $H_2$ and CO, to a combined total of not more than 50 vppb (volume parts per billion), preferably not more than 20 vppb, and more preferably not more than 10 vppb, by catalytically hydrolyzing HCN to $NH_3$, washing the $NH_3$ and at least a portion of remaining HCN out of the gas with water, and adsorbing any HCN and $NH_3$ remaining in the gas to form a clean syngas. The adsorption step is optional and depends on the HCN concentration leaving the hydrolysis reactor and the concentration of the combined amounts of HCN and $NH_3$ desired in the clean syngas. However, while adsorption following water scrubbing may be optional depending on the hydrolysis catalyst and conditions, in most cases one or more adsorbent beds will follow the water scrubbing to protect against failures in the hydrolysis or scrubbing zones and concomitant breakthrough of HCN and $NH_3$ in the treated gas. The hydrolysis reaction of the HCN to $NH_3$ requires the presence of minor amounts of water vapor or steam, which is typically present in syngas formed by most syngas generating processes in an amount well in excess of that required for the hydrolysis. The invention is useful with any hydrocarbon synthesis (HCS) process in which the HCS catalyst is deactivated by HCN and $NH_3$ in the syngas feed passed into the HCS reaction zone, including a slurry HCS process. It has been found that if the combined total of the HCN and $NH_3$ catalyst poisons present in the syngas are greater than about 50, 20, and even 10 vppb, the HCS catalyst will have an unacceptably short life, which requires large amounts of hydrogen to rejuvenate it. For example, in a slurry HCS process using a catalyst comprising Co-Re on titania composited with silica-alumina, an 800 vppb HCN concentration in the syngas will result in a catalyst having a half life of only 12 hours. At 100 vppb (0.1 ppm) the half life is 4 days. In contrast, at 50 vppb the catalyst half life is about 8 days, at 20 vppb it is 20 days, and at 10 vppb it is 40 days. As a practical matter the catalyst should have a half life of at least about 8 days, preferably at least about 20 days, and more preferably at least about 40 days to reduce rejuvenation hydrogen consumption, and maintain good productivity and selectivity to liquid products. Therefore, the combined total of the $NH_3$ and HCN concentration in the syngas is reduced to less than 50 vppb, preferably less than 20 vppb and more preferably below 10 vppb, in order to reduce the catalyst deactivation to a commercially acceptable level. In batchwise catalyst rejuvenation, decreased catalyst half life also means increased reactor downtime and concomitantly less productivity. Further, as the catalyst deactivates, the reaction temperature must be raised to obtain the same amount of CO conversion, and higher reactor temperatures produce more methane and less valuable liquid hydrocarbon products. The process of the invention reduces the combined total of the HCN and $NH_3$ to this low level by sequentially hydrolyzing HCN to $NH_3$, washing the $NH_3$ and at least a portion of remaining HCN out of the gas with water and, optionally, adsorbing residual amounts remaining after the first two steps with a solid adsorbent to produce a clean gas having the desired level of a combined amount of HCN and $NH_3$. This substantially reduces both catalyst deactivation and rejuvenation requirements. By deactivated catalyst is meant a catalyst which loses its activity when contacted with HCN and/or $NH_3$ and, in a preferred embodiment, one that is reversibly deactivated and for which the activity is restored by contacting the catalyst with a suitable rejuvenating gas, such as hydrogen. Examples of HCS catalysts which are reversibly deactivated by HCN and $NH_3$ include catalysts containing cobalt, which are described below.

While the invention has been demonstrated with syngas, it is not intended to be so limited and in its broadest sense relates to a process for removing HCN and $NH_3$ from a gas. In one embodiment the invention relates to a hydrocarbon synthesis process in which a syngas containing HCN, or HCN and $NH_3$ is passed through a catalytic hydrolysis zone to hydrolyze HCN to $NH_3$, followed by washing the hydrolyzed gas with water, and then, optionally, contacting the washed gas with a solid adsorbent to reduce the combined total of HCN and $NH_3$ in the syngas to less than 50, preferably less than 20 and more preferably less than 10 vppb, to form a clean syngas. The clean syngas is then passed into an HCS reaction zone in which it contacts a suitable catalyst at conditions effective for forming liquid hydrocarbons from the gas. The liquid hydrocarbons are removed from the HCS reaction zone, fractionated and processed to form products which may include a synthetic crude oil, liquid fuel (e.g., naphtha, gasoline, diesel, jet and kerosene), lubricating, industrial light and heavy oils, medicinal oils and wax. In a more detailed embodiment relating to a catalytic HCS process, the invention comprises the steps of:

(a) passing water vapor and a syngas comprising a mixture of $H_2$ and CO which contains HCN through a catalytic hydrolysis zone in which said gas and water vapor contact a hydrolysis catalyst at conditions effective to convert at least a portion of said HCN to $NH_3$ to form a hydrolyzed gas;

(b) passing said hydrolyzed gas through a water scrubbing zone in which it is contacted with water to dissolve $NH_3$ and at least a portion of remaining HCN from said gas to form a scrubbed syngas and optionally passing said scrubbed gas through an adsorption zone in which it contacts an adsorbent to adsorb at least a portion of HCN and $NH_3$ remaining after said scrubbing to produce a clean syngas which contains less than about 50 vppb of said combined total amount of HCN and $NH_3$, and (c) contacting said clean syngas with a hydrocarbon synthesis catalyst at conditions effective to form liquid hydrocarbons.

In a slurry HCS process, the catalyst is a particulate catalyst dispersed in a hydrocarbon slurry liquid and the clean syngas is bubbled up through the slurry in which it contacts the catalyst. The hydrocarbon slurry liquid comprises hydrocarbon products of the HCS reaction which are liquid at the reaction conditions. In a further embodiment, a gas comprising methane, water vapor and nitrogen (such as a humidified natural gas) is fed into a syngas generating zone to form a syngas comprising a mixture of $H_2$ and CO, along with HCN or a mixture of HCN and $NH_3$, the combined total of which are present in said syngas in an amount typically greater than 100 vppb. In a preferred HCS process embodiment of the invention, irrespective of whether the HCS reactor contains a reactive slurry, fixed bed or fluidized HCS catalyst, the HCN hydrolysis catalyst zone will comprise an oxide of at least one metal selected from the group consisting essentially of a Group VI metal, a Group IVB metal and mixture thereof and particularly an oxide of Al and at least one of Mo and Ti. It has been found that at least about 95%, typically at least 98% and even more than 99% of the HCN is converted to $NH_3$ using such catalysts at a temperature broadly ranging from between about 150–350° C. The invention is not limited to a syngas produced by any particular process or from any particular carbonaceous material. In an embodiment in which the gas cleaning process of the invention is employed in connection with a hydrocarbon synthesis process, the hydrolysis catalyst will preferably contain less than 1000 ppm of sulfur and less than 1000 ppm of chlorine. In a further embodiment, the water used to scrub the syngas in the scrubbing zone will comprise the hydrocarbon synthesis product water. In this further embodiment, the HCS product water is stripped with a stripping gas to remove oxygenates produced by the HCS reactions from the water. This assures that the oxygenates are not carried back into the HCS reactor where they can deactivate the HCS catalyst, and it also simultaneously humidifies the gas feed going into the syngas generator.

BRIEF DESCRIPTION OF THE DRAWING

The FIGURE is a schematic block diagram of a process for removing HCN and $NH_3$ from a syngas according to the practice of the invention.

DETAILED DESCRIPTION

In a Fischer-Tropsch HCS process, a syngas comprising a mixture of $H_2$ and CO is catalytically converted into hydrocarbons, and preferably liquid hydrocarbons. The mole ratio of the hydrogen to the carbon monoxide may broadly range from about 0.5 to 4, but is more typically within the range of from about 0.7 to 2.75 and preferably from about 0.8 to 2.5. The stoichiometric mole ratio for a Fischer-Tropsch HCS reaction is 2.0, but there are many reasons for using other than a stoichiometric ratio as those skilled in the art know and a discussion of which is beyond the scope of the present invention. In a slurry type HCS process the mole ratio of the $H_2$ to the CO is typically about 2.1/1. The syngas may be formed by various means, including contacting a hot carbonaceous material such as coke or coal, with steam, or from a feed comprising methane. A feed comprising methane is preferred for convenience, cleanliness and because it doesn't leave large quantities of ash to be handled and disposed of The methane containing gas feed fed into the syngas generator comprises natural gas or is obtained by burning coal, tar, liquid hydrocarbons and the like. Irrespective of the methane source, nitrogen and gaseous compounds of sulfur, phosphorous and other elements are invariably present. The production of syngas from methane by either partial oxidation, steam reforming or a combination thereof is well known as is disclosed, for example, in U.S. Pat. No. 4,888,131. In many cases it is preferred to catalytically partially oxidize and steam reform the methane in a fluid bed syngas generating unit (FBSG) which typically employs a catalyst comprising nickel on an attrition resistant support as is disclosed, for example, in U.S. Pat. Nos. 4,888,131 and 5,160,456. During the partial oxidation and reforming of the methane to the syngas, some of the nitrogen is converted into HCN and $NH_3$ which, along with sulfur and phosphorous compounds, must be removed from the syngas before it contacts the HCS catalyst in the reactor, or the catalyst will deactivate. Sulfur and phosphorous compounds will permanently deactivate the catalyst. Their removal from the syngas is accomplished by means known to those skilled in the art and is beyond the scope of this disclosure. As stated above, it has now been found that deactivation by these nitrogenous species is reversible and the catalyst can be rejuvenated by contacting it with hydrogen. This restoration of the catalytic activity of a reversibly deactivated catalyst is referred to as catalyst rejuvenation. It has now further been found that unacceptable catalyst deactivation occurs if the combined amount of the HCN and $NH_3$ present in the syngas being fed into an HCS reactor is greater than 50, 20 and even 10 vppb. Consequently, intermittent or continuous catalyst rejuvenation with hydrogen or a hydrogen containing gas is required to maintain a reasonable degree of catalyst productivity and selectivity to liquid hydrocarbons. As mentioned above, with one particular Co metal containing HCS catalyst in a reactive HCS slurry, 100 vppb of a combined total of HCN and $NH_3$ present in the syngas results in the catalyst having a half life of only 4 days. By half life is meant that the overall activity of the catalyst body is reduced by 50% in 4 days. An activity level of 50% is totally unacceptable. It means that the productivity of the catalyst (and, concomitantly the reactor), measured in terms of CO conversion, is only 50% of what it should be in 4 days. A productivity level of at least 90% is desired. This means that in cyclic or batchwise rejuvenation, the reactor is taken off-line for ¼ of each day to maintain the activity level at no less than about 90%, during which time the catalyst in the reactor is rejuvenated with hydrogen. As a practical matter, the reactor is off-line more than ¼ of each day, due to the time it takes to purge out the syngas, pass in the hydrogen or hydrogen containing catalyst rejuvenating gas and then restart the HCS reaction. This results in a continuous average 25% loss of hydrocarbon production from the reactor, even with rejuvenation. At a combined HCN and $NH_3$ level of 20 vppb in the syngas, the catalyst half life is 20 days. This means that about every fourth day the catalyst has to be rejuvenated, using the same amount of time and hydrogenation for the rejuvenation as for the case above, yielding an average production loss of only about 6%. At 50 vppb, it is about 15%. At a combined level of 10 vppb, the catalyst half life is about 40 days and the catalyst has to be rejuvenated for ¼ of a day every 8 days, yielding a productivity loss of only about 3%. In the case of a slurry HCS process, the catalyst in the slurry can be either continuously rejuvenated with the reactor remaining on-line using the methods disclosed in U.S. Pat. Nos. 5,260,239 and 5,268,344. Nevertheless, the case of a catalyst half life of only 4 days will still consume four times more hydrogen rejuvenation gas than if the half life were 20 days, and eight times the amount required for a 40 day half life.

As mentioned above, prior art methods have included catalytic hydrolysis and chemical scrubbing for reducing the synthesis gas HCN content to 0.01 vol. % or 100 vppb. However, it has now been shown above that even 100 vppb of HCN in the syngas is an unacceptably high level. Further, HCN removal by alkaline scrubbing and with alkaline ferrous sulphate solutions is also hampered by the presence of other acidic materials in the syngas, particularly $CO_2$. Washing with water which contains chemicals is further disadvantaged by process complexity, costly chemical consumption, and waste disposal demands Also, while $NH_3$ is water soluble, HCN is not soluble enough in water to be able to remove it down to the low levels of $\leq 50$ vppb, preferably $\leq 20$ vppb and more preferably $\leq 10$ vppb required to achieve reasonable levels of catalyst half life. Chemical scrubbing processes are not selective enough to remove the HCN down to these levels. Some prior art catalytic conversion processes have employed relatively low activity catalysts which require excessive catalyst volume and/or high processing temperatures. Other processes have employed sulfided catalysts which will leak out sulfur and irreversibly deactivate an HCS catalyst downstream. Processes which rely primarily or solely on adsorption to remove the HCN and $NH_3$ require impracticably large quantities of adsorbent to achieve useful operating times to reduce the combined HCN and $NH_3$ concentration to the desired levels. Thus, the removal of $NH_3$ and HCN from the syngas and the need for continuous catalyst rejuvenation has been a problem and the present invention is a solution to this problem in removing the HCN from the syngas down to these low levels, to form an essentially clean syngas, from the perspective of providing an acceptable HCS catalyst half life, without the drawbacks of the prior art processes.

In a preferred embodiment of the invention, and as mentioned above, the catalyst in the HCN hydrolysis zone comprises an oxide of at least one metal selected from the group consisting essentially of a Group VI metal, a Group IVB metal and mixture thereof and particularly an oxide of Al and at least one of Mo and Ti. The catalyst will comprise a composite oxide of from about>0 to 30 wt. % Mo as the oxide, preferably 10 to 20 wt. %, with the titania present in an amount of about>0 to 30 wt. %, preferably 4 to 20 wt. %, more preferably 8–16 wt. % (e.g., 8 wt. %), with the remainder being alumina. The catalyst may be readily prepared by depositing suitable sources of molybdenum and titanium on an alumina support and after deposition by, for example, impregnation or incipient wetness techniques, the composite is dried and then calcined at temperatures of from about 250–500° C., and preferably 350–450° C. to produce the oxide form. It is preferred that the catalyst be treated with hydrogen at a temperature of from about 200–600° C., preferably 230–550° C. for from 1–24 hours. The alumina may be any alumina useful as a catalyst support and typically one having a surface area of between about 100–400 $m^2$/g. The HCN hydrolysis is preferably carried out at a temperature of from about 150–350° C. Suitable pressures range from about 1–100 bar, with preferred pressures being the range of from about 10–50 bar. Suitable space velocities may range from about 5000 to 50000 $hr^{-1}$. The amount of HCN to be hydrolyzed and removed from the synthesis gas is typically very small (e.g.,<5000 vppb). Water typically present in an amount of from about 5–25 volume % results from the syngas generation, although the actual amount of water present may be greater or lower, and this amount of water is more than sufficient to hydrolyze the relatively minor amount of HCN present in the syngas. During the hydrolysis reaction, the HCN reacts with water and is converted to $NH_3$ and CO. At least about 95%, typically at least 98% and even more than 99% of the HCN is converted to $NH_3$. In one embodiment, a suitable catalyst of this type was prepared by mulling 343 grams of Catapal SB alumina (27% moisture content) with 237 grams of titanium isopropoxide in isopropanol and extruded and calcined in air for 2 hours at 538° C. The calcined extrudate (250 g) was impregnated with a solution of 62 g ammonium heptamolybdate and 66.5 g citric acid in 125 cc of deionized water, dried and calcined in air at 538° C. for 2 hours. The catalyst was then placed in the hydrolysis reactor and activated by passing hydrogen through the catalyst bed at a space velocity of 3000 $hr^{-1}$, a pressure of 25 psig and a temperature of 600° F. for 10 hours. In the catalyst example above, which is a preferred embodiment, the catalyst contains less than 100 wppm of sulfur (weight parts per million), preferably less than 50 wppm of sulfur and less than 200 wppm of chlorine.

The FIGURE is a schematic block diagram of a process for removing HCN and $NH_3$, from a syngas according to the practice of the invention. In this embodiment a hot syngas stream formed from natural gas in an upstream FBSG (not shown) is passed via lines 10 and 14 through a heat exchanger 16. Excess $CO_2$, sulfur and phosphorous compounds are removed from the gas by means known in the art before it enters the syngas unit. An FBSG syngas generating unit operates at about 1800° F. (982° C.) and the syngas exiting the unit is typically scrubbed with water to cool the gas and remove catalyst fines. Heat exchanger 16 is used to adjust the temperature of the syngas to the preferred range of from about 150–350° C., by either heating or cooling, as required. The syngas is then passed from the heat exchanger into catalytic HCN hydrolysis reactor 20 via line 18, in which it contacts a catalyst which hydrolyzes the HCN to $NH_3$. The interior of the reactor is an HCN hydrolysis zone which contains a fixed bed 22 of a suitable HCN hydrolysis catalyst (not shown) useful in the practice of the invention, and preferably a catalyst having a composition as set forth above. Depending on the level of the HCN and water vapor present in the syngas, steam may or may not be injected via line 12 into the syngas stream being fed into the hydrolysis reactor. A natural gas comprising about 96% methane and 4% nitrogen which is catalytically partially oxidized and steam reformed in an FBSG operating at about 1800° F. and 400 psia, will produce a syngas having an equilibrium limited amount of HCN and $NH_3$ of about 5 ppm and 300 ppm, respectively, and in the embodiment of this example, this is the amount present in the syngas fed into the catalytic hydrolysis zone 22. The temperature, pressure and space velocity in the HCN hydrolysis zone 22 may broadly range from about 100–400° C., 1–100 atm and 2000–50000 GHSV. The hydrolysis temperature is chosen so as to achieve a hydrolysis rate sufficient to achieve at least 95%, preferably at least 98% and still more preferably at least 99% conversion of the HCN to $NH_3$ in the hydrolysis reactor, depending on the level of the HCN in the gas, while avoiding undesirable side reactions such as methanation of the CO present in the syngas. In one experiment, syngas containing on a volume % basis, 43% $H_2$, 21.2% CO, 7% $CO_2$, 8.6% $N_2$, 5.4% $CH_4$, 15% $H_2O$, 340 vppm $NH_3$ and 6.4 vppm HCN was passed through the HCN hydrolysis zone at 205° C., 26.4 atm., and 12000 hr-1 space velocity, in which it contacted an HCN hydrolysis catalyst which comprised an alumina and titania support material which was impregnated with ammonium heptamolybdate and calcined as outlined above. The HCN concentration in the syngas exiting the reactor was less than 20 vppb which represented more than 99% removal of the HCN. A repeat of this experiment using more sensitive analytical procedures revealed it to be less than 10 vppb. The hydrolysis reactor was operated for 127 days with no measurable decrease in HCN removal activity. In another experiment, identical to the experiment above, but wherein the temperature in the hydrolysis reactor was at 165° C., the concentration of HCN in the exiting syngas was 269 vppb, indicating 95.8% conversion of HCN in the reactor. In this latter case, adsorption following scrubbing is not an option for reducing the combined total of HCN and $NH_3$ down to the desired level of no more than 50 vppb maximum, due to the limited solubility of HCN in water.

The advantage of converting the HCN into $NH_3$ is that $NH_3$ is easily removed by dissolving it in water via washing the syngas in a scrubber, whereas the HCN is not soluble enough in water to remove it from the gas down to the desired levels. In fact, quantitative removal of $NH_3$ by water washing is easily achieved. On the other hand, depending on the water temperature and the wash rate, only about 25% of the HCN dissolves in the water. In the example above, the amount of HCN remaining in the syngas after hydrolysis is<20 vppb. The syngas exits the hydrolysis unit via line 24, is passed through a heat exchanger 26 in which it is cooled down to a temperature of about 50° C. and is then passed via line 28 into a scrubber 30 which is a cap and tray column, a packed tower containing high surface area packing such as rashig rings, and the like. Wash water at a temperature of about 50° C. enters the top of the scrubber via line 32 and flows down thereby contacting the upward flowing syngas and dissolving substantially all of the ammonia in the gas to produce a scrubbed syngas having an $NH_3$ content less than 20 vppb and preferably less than 10 vppb of $NH_3$, and about 10 vppb of HCN. While in this example the scrubber operates at 50° C., it may be operated at a temperature of from about 25–120° C. The effluent water containing the removed $NH_3$ is removed from the scrubber via line 33 and disposed of in any convenient manner, including recycle back to the syngas generating step, stripping out the $NH_3$ with nitrogen or fuel gas, and disposition into a fuel stream or by biological treatment. Wash water is obtained from any convenient source, including the water produced by the downstream HCS reaction after it has been separated from gas and liquid products of the HCS reaction. In this embodiment, the hydrocarbon synthesis reaction water is first processed by stripping with natural gas used to feed the syngas generation step to form a treated water. This serves to humidify the natural gas and also removes water soluble organic compounds and particularly low molecular weight alcohols and organic acids produced by the HCS reaction from the reaction water. Otherwise, the alcohols and organic acids in the gas will be preferentially adsorbed in adsorption zones 42 and 43, thereby reducing the capacity of the adsorbent for adsorbing the HCN and $NH_3$. Typical water soluble organic acids include acetic and proprionic acids. The scrubbed syngas leaves the scrubber via line 34, is passed through heat exchanger 36 which cools the gas to a temperature of 25–120° C. to improve the efficiency of the subsequent adsorption step, and is then passed via lines 38, 40 and 41 into a pair of parallel adsorption zones 42 and 43, in which it contacts one or more solid adsorbents which are selective for adsorption of HCN in the presence of CO, $CO_2$, $H_2$ and $H_2O$, illustrative, but nonlimiting examples of which include zeolite molecular sieves, activated carbon, ZnO, alumina and the like, with activated alumina and activated carbon being preferred. The adsorption of the residual HCN and $NH_3$ is carried out at temperatures of from 25 to 120° C., pressures of from 1 to 100 atm and space velocities of from about 2000 to 20000 scf/hr. The lower the HCN content of the syngas exiting the hydrolysis and scrubbing zones, the less HCN has to be adsorbed. This results in longer adsorption bed life and less regeneration. While only a pair of parallel adsorption zones or vessels are illustrated in this example for the sake of convenience, several adsorption vessels may be employed with one or more on-line in the adsorption mode and others off-line in a desorption mode. Desorption or regeneration of the adsorbent is accomplished by passing an HCN-free gas, such as natural gas, nitrogen or air, over the adsorbent as is known to those skilled in the art. The desorption temperature is typically in the range of from about 100–300° C., although higher and lower temperatures of from about 25 to 400° C. may also be used. The adsorbent regenerating gas containing the desorbed HCN may be disposed of in any convenient manner, such as blending with fuel gas or recycle to the syngas generation step. The resulting syngas from this adsorption step will contain less than 20 and preferably less than 10 vppb of the combined total amount of HCN and $NH_3$ present, and is suitable for both Fischer-Tropsch and methanol synthesis. The resulting clean syngas is then passed via lines 44, 45 and 46 into a hydrocarbon synthesis reactor (not shown) to produce hydrocarbons. A further advantage of having one or more adsorption zones following the water scrubbing, is protection against sulfur or chlorine breakthrough in the event these contaminants enter the gas stream from one source or another. The minute levels of these nitrogen compounds in the syngas results in the production of very pure hydrocarbon liquids which are easily fractionated and upgraded, without the need for the more severe hydroprocessing and hydrotreating that is required if such compounds are present in the liquid products. This is because hydroprocessing catalysts are poisoned by nitrogen compounds, which means that the processes have to be run hotter and at higher pressures which is more selective to gas make and less selective to the desired liquid products than lower temperatures and pressures.

In an HCS process, liquid and gaseous hydrocarbon products are formed by contacting a syngas comprising a mixture of $H_2$ and CO, preferably under non-shifting conditions in which little or no water gas shift reaction occurs when the catalytic metal comprises Co, Ru or mixture thereof, with a suitable Fischer-Tropsch reaction type of catalyst comprising, for example, one or more Group VIII catalytic metals such as Fe, Ni, Co, Ru and Re. In one embodiment the catalyst comprises catalytically effective amounts of Co and one or more of Re, Ru, Fe, Ni, Th, Zr, Hf, U, Mg, La on a suitable inorganic support material, preferably one which comprises one or more refractory metal oxides. Preferred supports for Co containing catalysts comprise titania, particularly when employing a slurry HCS process in which higher molecular weight, primarily paraffinic liquid hydrocarbon products are desired. Useful catalysts and their preparation are known and illustrative, but nonlimiting examples may be found, for example, in U.S. Pat. Nos. 4,568,663; 4,663,305; 4,542,122; 4,621,072 and 5,545,674.

The hydrocarbon products produced by an HCS process according to an embodiment of the invention are invariably upgraded to form suitable products comprising at least one product selected from the group consisting essentially of a synthetic crude oil, a liquid fuel, a lubricating, industrial or medicinal oil and a waxy hydrocarbon. This is accomplished by subjecting all or a portion of the HCS hydrocarbon products to fractionation and one or more hydroconversion steps in which a suitable fraction is contacted with a suitable catalyst, in the presence of hydrogen, to upgrade the fraction by converting the molecular structure of at least a portion of the hydrocarbon material to form the desired product, as is known to those skilled in the art. Liquid fuel includes one or more of motor gasoline, solvents, diesel fuel, jet fuel, kerosene and the like. Lubricating oil includes automotive, jet, turbine, metal working oils and the like. Industrial oil includes well drilling fluids, agricultural oils, heat transfer fluids and the like. The solid, waxy material may be upgraded and used for various purposes or isomerized and preferably hydroisomerized to form a liquid product such as a lubricating or other oil or cracked, and preferably hydrocracked, into lower boiling fractions, including fuels. Hydroconversion operations other than hydroisomerization and hydrocracking include, as is known to those skilled in the art, relatively mild hydrotreating also known as hydrofinishing, and the more severe hydrotreating.

It is understood that various other embodiments and modifications in the practice of the invention will be apparent to, and can be readily made by, those skilled in the art without departing from the scope and spirit of the invention described above. Accordingly, it is not intended that the scope of the claims appended hereto be limited to the exact description set forth above, but rather that the claims be construed as encompassing all of the features of patentable novelty which reside in the present invention, including all the features and embodiments which would be treated as equivalents thereof by those skilled in the art to which the invention pertains.

What is claimed is:

1. A process for reducing the amount of HCN and $NH_3$ present in a gas which comprises passing said gas through an HCN hydrolysis zone in the presence of water vapor in which said gas contacts an HCN hydrolysis catalyst at conditions effective to hydrolyze HCN to $NH_3$ and form a hydrolyzed gas, with said hydrolyzed gas removed from said hydrolysis zone and contacted with water in a scrubbing zone to dissolve $NH_3$ and at least a portion of remaining HCN to form a scrubbed gas in which the combined total of $NH_3$ and HCN is less than 50 vppb, wherein said catalyst comprises an oxide of aluminum, an oxide of Mo and an oxide of Ti, wherein said Mo oxide is present in an amount of from 10–20 wt. % and said Ti oxide is present in an amount of 4–20 wt. %, with the remainder comprising alumina and wherein said hydrolysis catalyst is treated with hydrogen at a temperature ranging from 200–600° C. prior to hydrolyzing said HCN to $NH_3$.

2. A process according to claim 1 wherein said gas comprises a synthesis gas.

3. A process according to claim 2 wherein said hydrolysis removes at least 95% of said HCN.

4. A process according to claim 3 wherein said oxide of Mo is supported on a mixture of said Al and Ti oxides.

5. A process according to claim 4 wherein said oxide of Ti is present in an amount of from 8–16 wt %.

6. A process according to claim 4 wherein said catalyst contains less than 1000 ppm sulfur or chlorine.

7. A process according to claim 6 wherein said scrubbed gas is passed through a solid adsorbent for further removing HCN and $NH_3$ from said gas to form a clean gas having a combined total of $NH_3$ and HCN of less than 20 vppb.

8. A process according to claim 7 wherein said combined total of $NH_3$ and HCN is less than 10 vppb.

9. A process according to claim 3 wherein said catalyst is treated with hydrogen at a temperature of from 200–600° C. prior to hydrolyzing said HCN to $NH_3$ and said scrubbed gas is contacted with a solid adsorbent to remove further HCN and $NH_3$ to form a clean gas having a combined total of $NH_3$ and HCN is less than 20 vppb.

10. A hydrocarbon synthesis process for making hydrocarbons, at least a portion of which are upgraded to products comprising at least one product selected from the group consisting of a synthetic crude oil, a liquid fuel, a lubricating, industrial or medicinal oil, a waxy hydrocarbon and mixture thereof, said process comprising the steps of:

(a) passing $H_2O$ and a synthesis gas comprising a mixture of $H_2$ and CO which contains HCN and $NH_3$ through a catalytic hydrolysis zone in which said gas and water vapor contact a catalyst which converts at least a portion of said HCN to $NH_3$ to form a hydrolyzed gas of reduced HCN content, wherein said catalyst comprises an oxide of aluminum, an oxide of Mo and an oxide of Ti, wherein said Mo oxide is present in an amount of from 10–20 wt. % and said Ti oxide is present in an amount of 4–20 wt. %, with the remainder comprising alumina and wherein said hydrolysis catalyst is treated with hydrogen at a temperature ranging from 200–600° C. prior to hydrolyzing said HCN to $NH_3$;

(b) passing said hydrolyzed gas through a water scrubbing zone in which it is contacted with water to dissolve $NH_3$ and at least a portion of remaining HCN from said gas to form a scrubbed syngas and optionally passing said scrubbed gas through an adsorption zone in which it contacts an adsorbent to adsorb at least a portion of HCN and $NH_3$ remaining after said scrubbing to produce a clean syngas which contains less than about 50 vppb of said combined total amount of HCN and $NH_3$;

(c) passing said clean syngas into a hydrocarbon synthesis reactor in which gas contacts a particulate hydrocarbon synthesis catalyst at conditions effective to form hydrocarbons from said gas, and (d) removing said hydrocarbons from said reactor.

11. A process according to claim 10 wherein at least a portion of said hydrocarbons are processed to form at least one of said products.

12. A process according to claim 11 wherein said hydrolysis catalyst has less than about 1000 ppm of sulfur or chlorine.

13. A process according to claim 12 wherein said hydrolysis removes at least 95% of said HCN.

14. A process according to claim 13 wherein said Mo oxide is supported on a mixture of said Al and Ti oxides.

15. A process according to claim 14 wherein said Ti oxide is present in an amount of from 8–16 wt. %.

16. A process according to claim 14 wherein said scrubbed gas is passed through a solid adsorbent for further removing HCN and $NH_3$ from said gas, to form a clean gas having a combined total of $NH_3$ and HCN of less than 20 vppb.

17. A process according to claim 13 wherein said catalyst is treated with hydrogen at a temperature of from 200–600° C. prior to hydrolyzing said HCN to $NH_3$.

18. A process according to claim 17 wherein and said scrubbed gas is contacted with a solid adsorbent.

* * * * *